United States Patent [19]

Pfaff

[11] Patent Number: 5,707,567
[45] Date of Patent: Jan. 13, 1998

[54] PROCESS FOR PRODUCING A SELF-SINTERED SILICON CARBIDE/CARBON GRAPHITE COMPOSITE MATERIAL HAVING INTERCONNECTED PORES WHICH MAYBE IMPREGNATED

[75] Inventor: Mark E. Pfaff, St. Marys, Pa.

[73] Assignee: The Morgan Crucible Company PLC, Windsor, United Kingdom

[21] Appl. No.: 459,270

[22] Filed: Jun. 2, 1995

Related U.S. Application Data

[60] Division of Ser. No. 201,686, Feb. 25, 1994, Pat. No. 5,580,834, which is a continuation-in-part of Ser. No. 17,735, Feb. 10, 1993, Pat. No. 5,422,322.

[51] Int. Cl.$^6$ .................................................. C01B 31/00
[52] U.S. Cl. ........................ 264/29.7; 264/29.1; 264/29.6; 264/44; 264/60; 427/228; 427/383.5; 427/393.6; 501/90; 501/99
[58] Field of Search ................................. 264/29.1, 29.6, 264/29.7, 44, 60; 427/228, 383.5, 393.6; 501/90, 99

[56] References Cited

U.S. PATENT DOCUMENTS

| Re. 30,286 | 5/1980 | Coppola et al. | 264/65 |
|---|---|---|---|
| 2,609,318 | 9/1952 | Swentzel | 154/43 |
| 2,614,946 | 10/1952 | Proudfoot | 117/100 |

(List continued on next page.)

FOREIGN PATENT DOCUMENTS

| 0145496 | 3/1989 | European Pat. Off. . | |
|---|---|---|---|
| 0486336 | 10/1991 | European Pat. Off. | C04B 38/00 |
| 0500447 | 2/1992 | European Pat. Off. | C04B 35/56 |
| 0522945 | 7/1992 | European Pat. Off. | C04B 41/82 |
| 62-82047 | 4/1987 | Japan | B41J 3/10 |
| 62-132785 | 6/1987 | Japan | C04B 41/83 |
| 62-138377 | 6/1987 | Japan | C04B 41/87 |

(List continued on next page.)

OTHER PUBLICATIONS

Pure Industries, Inc.,Pure Carbon Co., Brochure entitled "The Carbon Component Specialist" (No Date).

Pure Industries, Inc., Pure Carbon Co., Brochure entitled "Rubbing Components for Mechanical Seals" (No Date).

Pure Industries, Inc., Pure Carbon Co., Brochure entitled "Bearings for Difficult Applications" (No Date).

Pure Industries, Inc., Pure Carbon Co., Brochure entitled "Purebide Components for Demanding Applications" (No Date).

"Investigation of Ceramics for High Temperature Turbine Vanes" Final Report, Mar. 1972, by Svante Prochazka, prepared under Contract N00019-71-C-0290 for Department of Navy.

(List continued on next page.)

*Primary Examiner*—Donald E. Czaja
*Assistant Examiner*—Michael Philip Colaianni
*Attorney, Agent, or Firm*—Kilpatrick Stockton LLP; Bruce D. Gray

[57] ABSTRACT

A self-sintered silicon carbide/carbon-graphite composite material having interconnected pores which may be impregnated, and a raw batch and process for producing the composite material, is provided. The composite material comprises a densified, self-sintered matrix of silicon carbide, carbon-graphite inclusions and small amounts of any residual sintering aids, such as boron and free carbon, and has interconnected pores which may be impregnated with resin, carbon, TEFLON, (polyetrafluoroethylene) metal or other compounds or materials selected for their particular properties to achieve desired tribological characteristics for a specific application. The composite material is produced from a raw batch which includes silicon carbide, sintering aids, a temporary filler and coated graphite particles. The raw batch is then molded/shaped into a green body and heated to carbonize any carbonizable materials and to decompose and volatilize the organic filler to form a matrix of interconnected pores. The green body is pressureless sintered to densify the matrix. The interconnected pores may then be impregnated with a resin, carbon, metal, TEFLON, (polytetrafluoroethylene) compound or other material selected for desired tribological characteristics.

43 Claims, 9 Drawing Sheets

U.S. PATENT DOCUMENTS

| | | | |
|---|---|---|---|
| 2,614,947 | 10/1952 | Heyroth | 117/106 |
| 2,636,826 | 4/1953 | Nicholson | 106/44 |
| 2,691,605 | 10/1954 | Nediger | 117/62 |
| 2,784,112 | 3/1957 | Nicholson | 117/65 |
| 2,887,393 | 5/1959 | Taylor | 106/44 |
| 2,897,572 | 8/1959 | Hansen | 25/156 |
| 2,907,972 | 10/1959 | Schildhauer et al. | 338/332 |
| 2,916,460 | 12/1959 | Van Der Beck, Jr. | 252/516 |
| 2,941,962 | 6/1960 | Van Der Beck, Jr. | 252/516 |
| 3,051,564 | 8/1962 | Deeming | 75/53 |
| 3,094,679 | 6/1963 | O'Connor et al. | 338/330 |
| 3,108,887 | 10/1963 | Lenie et al. | 106/62 |
| 3,166,380 | 1/1965 | Kuhn | 23/208 |
| 3,175,884 | 3/1965 | Kuhn | 23/208 |
| 3,189,472 | 6/1965 | Taylor | 106/55 |
| 3,189,477 | 6/1965 | Shaffer | 117/46 |
| 3,205,043 | 9/1965 | Taylor | 23/208 |
| 3,252,827 | 5/1966 | Rose et al. | 117/201 |
| 3,305,372 | 2/1967 | Taylor | 106/55 |
| 3,372,305 | 3/1968 | Mikulec | 317/98 |
| 3,459,566 | 8/1969 | Wilson, Jr. et al. | 106/44 |
| 3,480,395 | 11/1969 | McMullen et al. | 23/208 |
| 3,513,019 | 5/1970 | Miller et al. | 117/123 |
| 3,520,667 | 7/1970 | Taylor | 51/295 |
| 3,765,300 | 10/1973 | Taylor et al. | 89/36 A |
| 3,796,564 | 3/1974 | Taylor et al. | 75/203 |
| 3,808,012 | 4/1974 | Bailey et al. | 106/44 |
| 3,852,099 | 12/1974 | Prochazka | 117/119 |
| 3,853,566 | 12/1974 | Prochazka | 117/119 |
| 3,859,399 | 1/1975 | Bailey et al. | 264/29 |
| 3,954,483 | 5/1976 | Prochanzka | 106/44 |
| 3,960,577 | 6/1976 | Prochazka | 106/44 |
| 3,968,194 | 7/1976 | Prochazka | 264/65 |
| 3,969,124 | 7/1976 | Stewart | 501/90 |
| 3,993,602 | 11/1976 | Prochazka | 252/504 |
| 4,004,934 | 1/1977 | Prochazka | 106/44 |
| 4,017,319 | 4/1977 | Greskovich et al. | 106/55 |
| 4,023,975 | 5/1977 | Prochazka | 106/44 |
| 4,031,178 | 6/1977 | Johnson et al. | 264/65 |
| 4,041,117 | 8/1977 | Prochazka | 264/63 |
| 4,080,415 | 3/1978 | Coppola et al. | 264/65 |
| 4,081,284 | 3/1978 | Prochazka et al. | 106/44 |
| 4,108,929 | 8/1978 | Prochazka et al. | 264/29.1 |
| 4,109,050 | 8/1978 | Mehan et al. | 428/332 |
| 4,119,475 | 10/1978 | Prochazka et al. | 106/73.5 |
| 4,119,689 | 10/1978 | Prochazka et al. | 264/65 |
| 4,119,690 | 10/1978 | Prochazka et al. | 264/65 |
| 4,120,731 | 10/1978 | Hillig et al. | 106/44 |
| 4,120,827 | 10/1978 | Boos et al. | 252/512 |
| 4,122,140 | 10/1978 | Greskovich et al. | 264/65 |
| 4,122,155 | 10/1978 | Prochazka et al. | 423/344 |
| 4,123,286 | 10/1978 | Coppola et al. | 106/44 |
| 4,124,402 | 11/1978 | Greskovich et al. | 106/73.5 |
| 4,124,403 | 11/1978 | Greskovich et al. | 106/75.5 |
| 4,124,667 | 11/1978 | Coppola et al. | 264/29.5 |
| 4,135,937 | 1/1979 | Murata et al. | 106/44 |
| 4,135,938 | 1/1979 | Murata et al. | 106/44 |
| 4,141,948 | 2/1979 | Laskow et al. | 264/101 |
| 4,144,207 | 3/1979 | Ohnsorg | 260/23 S |
| 4,148,894 | 4/1979 | Hillig et al. | 428/242 |
| 4,150,998 | 4/1979 | Morelock | 106/44 |
| 4,179,299 | 12/1979 | Coppola et al. | 106/44 |
| 4,207,226 | 6/1980 | Storm | 260/38 |
| 4,209,474 | 6/1980 | Prochazka | 264/29.474 |
| 4,225,356 | 9/1980 | Prochazka et al. | 106/73.5 |
| 4,233,256 | 11/1980 | Ohnsorg | 264/44 |
| 4,237,085 | 12/1980 | Smoak | 264/65 |
| 4,238,433 | 12/1980 | Hillig et al. | 264/60 |
| 4,240,835 | 12/1980 | Laskow et al. | 106/44 |
| 4,279,656 | 7/1981 | Greskovich et al. | 106/73.5 |
| 4,294,788 | 10/1981 | Laskow et al. | 264/101 |
| 4,312,954 | 1/1982 | Coppola et al. | 501/90 |
| 4,327,186 | 4/1982 | Murata et al. | 501/92 |
| 4,332,755 | 6/1982 | Murata | 264/65 |
| 4,346,049 | 8/1982 | Coppola et al. | 264/65 |
| 4,374,792 | 2/1983 | Prochazka et al. | 264/65 |
| 4,379,110 | 4/1983 | Greskovich et al. | 264/65 |
| 4,385,020 | 5/1983 | Morelock | 264/62 |
| 4,419,161 | 12/1983 | Hailey | 156/89 |
| 4,420,539 | 12/1983 | Kostikov et al. | 264/60 |
| 4,455,385 | 6/1984 | Prochazka | 501/90 |
| 4,524,138 | 6/1985 | Schwetz et al. | |
| 4,525,461 | 6/1985 | Boecker et al. | 501/90 |
| 4,530,808 | 7/1985 | Renlund et al. | 264/63 |
| 4,551,436 | 11/1985 | Johnson et al. | 501/90 |
| 4,551,496 | 11/1985 | Renlund et al. | 524/322 |
| 4,554,717 | 11/1985 | Vig et al. | 29/25.35 |
| 4,571,414 | 2/1986 | Renlund et al. | 524/322 |
| 4,649,022 | 3/1987 | Tischer et al. | 419/24 |
| 4,659,002 | 4/1987 | Wallgren et al. | 228/8 |
| 4,666,775 | 5/1987 | Kim et al. | 428/398 |
| 4,676,940 | 6/1987 | Kim et al. | 264/65 |
| 4,693,988 | 9/1987 | Boecker et al. | 501/89 |
| 4,908,340 | 3/1990 | Frechette et al. | 501/95 |
| 4,932,438 | 6/1990 | Kitamura et al. | 137/625.17 |
| 5,114,886 | 5/1992 | Tsukada | 501/88 |
| 5,395,807 | 3/1995 | Divakar et al. | 264/44 |
| 5,422,322 | 6/1995 | Chen et al. | |

FOREIGN PATENT DOCUMENTS

| | | | |
|---|---|---|---|
| 63-9781 | 1/1988 | Japan | F16K 3/02 |
| 63-26421 | 2/1988 | Japan | F16C 33/30 |
| 63-92915 | 4/1988 | Japan | G02B 26/10 |
| 63-163026 | 7/1988 | Japan | F16C 33/24 |
| 63-186076 | 8/1988 | Japan | F16K 1/34 |
| 64-37468 | 2/1989 | Japan | C04B 35/56 |
| 1172290 | 7/1989 | Japan | C04B 41/88 |
| 225581 | 1/1990 | Japan | C23C 22/78 |
| 2150024 | 6/1990 | Japan | H01L 21/302 |
| 2192464 | 7/1990 | Japan | C04B 35/56 |
| 31274 | 1/1991 | Japan | G06F 15/28 |
| 34511 | 1/1991 | Japan | H01G 9/02 |
| 365577 | 3/1991 | Japan | C04B 41/50 |
| 3215374 | 9/1991 | Japan | C04B 38/00 |
| 3215375 | 9/1991 | Japan | C04B 38/06 |

OTHER PUBLICATIONS

"Investigation of Ceramics for High Temperature Turbine Vanes" Final Report, Dec. 1972, by Svante Prochazka, prepared under Contract N00019–72–C–0129 for Department of Navy.

"Investigation of Ceramics for High Temperature Turbine Vanes" Final Report, Mar. 20, 1973–Dec. 19, 1973, by Svante Prochazka & Peter C. Smith, prepared under Contract N62269–73–C–0356 for Department of Navy.

"Investigation of Ceramics for High Temperature Turbine Vanes" Final Report, Jan. 23, 1974–Oct. 23, 1974, by Svante Prochazka et al., prepared under Contract N62269–74–C–0255 for Department of Navy.

"Investigation of Ceramics for High Temperature Turbine Components" Final Report, Dec. 1975, by Svante Prochazka et al., prepared under Contract N62269–75–C–0122 for Department of Navy.

"Investigation of Ceramics for High Temperature Turbine Components" Final Report, Mar. 25, 1976–Mar. 25, 1977, by Curtis A. Johnson et al., prepared under Contract N62269–76–C–0243 for Department of Navy.

"Substitution of Ceramics for Ductile Materials in Design" Report by J.A. Coppola et al., presented at National Symposium on Ceramics in the Service of Man, Jun. 7, 1976.

"Beta Silicon Carbide" Report by Peter T.B. Shaffer, Materials Research Bulletin, vol. 4, pp. S97–S106, 1969, proceedings of Silicon Carbide International Conference, University Park, PA, Oct. 20–23, 1968.

"Problems in Silicon Carbide Device Development" Report by Peter T.B. Shaffer, Materials Research Bulletin, vol. 4, pp. S13–S24, 1969, proceedings of Silicon Carbide International Conference, University Park, PA, Oct. 20–23, 1968.

"Phase Stability of Silicon Carbide in the Ternary System Si–C–N" Report by A.R. Kieffer et al., Material Research Bulletin, vol. 4, pp. S153–S166, 1969, proceedings of Silicon Carbide International Conference, University Park, Pa, Oct. 20–23, 1968.

"5.2.3 Silicon Carbide," pp. 5.2.3–1–5.2.3–11 (No Date).

Silicon Carbide—1973, edited by R.C. Marschall et al., pp. 343–402, 420–426, University of South Carolina Press, 1974.

"Sintered Alpha Silicon Carbide Pump Bearings—Tribiological Materials Optimization to Improve Reliability", by Heinrich Knoch, Joseph Kracker and William D. Long, Proceedings of the Tenth International Pump Users Symposium, Mar. 1993.

"Sintered Silicon Carbides with Controlled Porosity for Mechanical Face Seal Applications" by R. Divaker, STLE Lubrication, Journal of the Society of Tribologists and Lubrication Engineers, vol. 50, pp. 75–80, Presented at 48:Annual Meeting in Calgary, Alberta, Canada May 17–20, 1993.

Quarterly Progress Report No. 1, Report No. SRD–74–057, of contract N62269–74–C–0255, entitled "Investigation of Ceramics for High–Temperature Turbine Vanes," covering work performed from Jan. 23, 1974 to Apr. 23, 1974.

Semi–Annual Technical Report No. SRD–75–047 of contract N00014–74–C–0331, entitled "Ceramic Sintering" dated Apr. 1975.

Quarterly Progress Report No. 2, Report No. SRD–75–042, of contract N62269–75–C–0122, entitled "Investigation of Ceramics for High–Temperature Turbine Vanes," covering work performed from Jan. 19, 1975 to Apr. 18, 1975.

T-2890    $\frac{PGSIO420}{M-1830}$ vs $\frac{PR9242}{M-92-73}$    300,000 PV 10X1.25=12.5   50HRS 6-18-93      REACTION-BONDED SiC; 12.5X

FIG. 5B  SEAL BEFORE TESTING; 200X

FIG. 5C  SEAL AFTER INITIAL DRY RUN; 200X

FIG. 5D — MATING RING AFTER INITIAL DRY RUN; 400X

FIG. 5E — MATING RING AFTER COKING; 400X

FIG. 6A CONVENTIONAL SELF-SINTERED SiC BEFORE DRY RUN; 14X

FIG. 6B PRESENT INVENTION AFTER DRY RUN; 14X

FIG. 6C   CONVENTIONAL SELF-SINTERED SiC AFTER DRY RUN; 14X

FIG. 6D   PRESENT INVENTION AFTER DRY RUN; 14X

PROCESS FOR PRODUCING A SELF-SINTERED SILICON CARBIDE/CARBON GRAPHITE COMPOSITE MATERIAL HAVING INTERCONNECTED PORES WHICH MAYBE IMPREGNATED

This application is a division of U.S. patent application Ser. No. 08/201,686, now U.S. Pat. No. 5,580,834 filed Feb. 25, 1994, which is a continuation-in-part of U.S. patent application Ser. No. 08/017,735 Feb. 10, 1993, now U.S. Pat. No. 5,422,322.

FIELD OF THE INVENTION

This invention relates to the field of self-sintered silicon carbide/graphite composite materials and more particularly to self-sintered silicon carbide/carbon-graphite composite materials having interconnected pores which may be impregnated.

BACKGROUND OF THE INVENTION

Silicon carbide densified by self-sintering, also called pressureless sintering, is very hard, has good corrosion and abrasion resistance and high thermal conductivity. Self-sintered silicon carbide is used for sliding face applications, such as pump seals and bearings, in environments where such seals and bearings are exposed to acidic, caustic, corrosive or abrasive substances. However, self-sintered silicon carbide is not self-lubricating. Thus, if self-sintered silicon carbide is used in a seal or bearing face which runs against a face of another hard, non-self-lubricating material, such as self-sintered or reaction-bonded silicon carbide, the seal or bearing faces must be exposed to a lubricating fluid or used in fluid applications, such as in liquid pumps. The fluid provides a film between the sliding faces which lubricates the surfaces, reduces friction and prevents failure.

Self-sintered silicon carbide, when run against other hard, non-self-lubricating materials, is vulnerable to catastrophic failure when exposed to rapid temperature changes or if an insufficient amount of lubricating fluid is present, such as under upset conditions in pump applications when a pump accidently runs dry or if the pump is energized prior to connection of the fluid stream. Insufficient lubrication can cause the self-sintered silicon carbide to explode in the most severe conditions. Further, self-sintered silicon carbide used in sliding face applications against other non-self-lubricating materials exhibits high wear rates when under demanding conditions such as high speed and contact pressure.

Porous self-sintered silicon carbide also is not self lubricating, and has the disadvantages of self-sintered silicon carbide discussed above. Although, the surface pores of porous self-sintered silicon carbide can help the material to retain some lubricating fluid during use, the materials cannot be run dry. Thus, like self-sintered silicon carbide, porous self-sintered silicon carbide must be used in fluid applications where a lubricating fluid is provided.

Further, because the pores of porous self-sintered silicon carbide are not interconnected, porous self-sintered silicon carbide cannot be impregnated with resin, carbon, TEFLON, metals or other compounds or materials.

Siliconized graphite, i.e., graphite siliconized by chemical vapor reaction (CVR), has some self-lubricating properties and has good wear characteristics compared to self-sintered silicon carbide and other silicon carbide composites. Siliconized graphite is produced from specially formulated graphite which is reacted with silicon monoxide (SiO) vapor. The chemical vapor reaction produces a silicon carbide layer (typically 40 mm thick) on an underlying graphite substrate. The silicon carbide surface layer typically has a microstructure of graphite inclusions and interconnected pores throughout the surface layer. A lubricating substance can be impregnated in such pores to produce a self-lubricating material suitable for bearings and seals having a degree of survivability in dry-running conditions.

Siliconized graphite, however, has significant drawbacks. Because the self-lubricating silicon carbide structure is a thin surface layer, seals, bearings and other sliding face products made from siliconized graphite cannot be lapped, polished or repaired by a customer without risking penetration of the silicon carbide layer into the relatively soft graphite substrate. Also, the silicon carbide layer is prone to cracking, delamination and other defects. Further, siliconized graphite is very difficult to impregnate with carbon. Because the silicon carbide surface layer is thin, very porous and bonded to a relatively soft graphite substrate, the silicon carbide layer is weak. When the silicon carbide layer is impregnated with a carbon precursor, such as resin, and the precursor is carbonized, volatilization of the precursor usually causes the silicon carbide layer to crack, delaminate, break apart, or in some cases explode.

SUMMARY OF THE INVENTION

The present invention, which overcomes the shortcomings of the prior materials used for sliding face applications, includes a self-sintered silicon carbide/carbon graphite composite material having interconnected pores which may be impregnated with resin, carbon, TEFLON, metal or other compounds or materials selected to achieve desired tribological characteristics. The present invention also includes a raw batch and process for producing the composite material of the present invention.

The composite material of the present invention comprises a self-sintered, densified matrix of silicon carbide, carbon/graphite inclusions and small amounts of any residual sintering aids, such as boron and free carbon, and has interconnected pores, which may be impregnated with carbon, resin, metal, such as nickel, silver or antimony, TEFLON polytetrafluoroethylene, or other compounds or materials selected for their particular properties to achieve desired tribological characteristics for a specific application.

The composite material of the present invention has wear resistance superior to conventional and porous self-sintered silicon carbide, in that the material of the present invention can run against itself or other hard, non-self-lubricating materials in sliding face applications, such as for mechanical seals and pump bearings, at 200,000 psi-fpm PV or higher. The composite material of the present invention also has thermal shock resistance superior to conventional and porous self-sintered silicon carbide. In catastrophic failure or dry run conditions, such as when fluid is lost in pump applications, seals and bearings made of the material of the present invention have survivability and can maintain their integrity even at 400,000 psi-fpm PV, while seals and bearings made of self-sintered silicon carbide fail in seconds.

Further, because the composite material of the present invention has the same microstructure throughout the material, the material can be lapped, polished or repaired. The single microstructure of the material of the present invention also gives it a structural integrity and useful life superior to materials having surface layers, such as siliconized graphite.

The interconnecting porosity of the material of the present invention allows for impregnation of the material and tailoring of the tribological and other properties of the material for specific applications. The pores can be impregnated with a wide variety of metals, resins, carbon or other compounds or materials to produce a family of materials with different tribological characteristics for different applications. If the material of the present invention is to be used in sealing applications, the interconnected pores must be sufficiently impregnated to seal the material and prevent leaks.

Impregnation of the pores with such materials also provides further advantages. Impregnation of favorable tribological materials improves the mechanical properties, especially the wear and thermal shock resistance, of the present invention material over prior self-sintered silicon carbide materials, including porous self-sintered silicon carbide. Further, impregnation with a tough material, such as nickel or another metal, imparts a toughness to the present invention material not found in prior self-sintered silicon carbide materials, which are notorious for their brittleness.

The composite material of the present invention is produced from a raw batch which includes silicon carbide, sintering aids, a temporary filler and coated graphite particles. The raw batch is then molded/shaped into a green body and heated to carbonize any carbonizable materials and to decompose and volatilize the temporary filler to form a matrix having interconnected pores. The green body is then pressureless sintered to densify the matrix. The interconnected pores can then be impregnated with resin, carbon, metal, TEFLON or other compounds or materials selected for the desired tribological characteristics.

BRIEF DESCRIPTION OF THE DRAWINGS

The present invention will be more fully understood from the following detailed description considered in conjunction with the accompanying drawings, in which.

DETAILED DESCRIPTION OF THE INVENTION

The present invention includes a self-sintered silicon carbide/carbon-graphite composite material having interconnected pores which may be impregnated. The composite material comprises a densified self-sintered matrix of approximately 50 to 95% by weight silicon carbide, approximately 5.0 to 50% by weight carbon-graphite inclusions dispersed throughout the matrix and small amounts, approximately 0.3 or less to 5.0% by weight, of any residual sintering aids, such as aluminum, beryllium oxide, boron, boron carbide and/or free carbon. The composite material of the present invention has a microstructure of interconnected pores which may be impregnated with carbon, resin, TEFLON polytetrafluoroethylene, metal or other compounds or materials selected to achieve desired tribological characteristics for a specific application.

The matrix, which is self-sintered, or pressureless-sintered, typically has a density of at least approximately 2.20 gm/cc, or 73% of the theoretical density as determined by the rule of mixtures (before any impregnation of the interconnecting pores). The silicon carbide can be of the alpha form, the beta form or a combination of forms.

The carbon-graphite inclusions are distributed throughout the silicon carbide of the matrix and comprise particles of graphite coated with carbon. In the preferred embodiment, the average grain size of the carbon-graphite inclusions is greater than the average grain size of the silicon carbide. For example, in the preferred embodiment, the silicon carbide has an average grain size between approximately 10 and 25 μm, and the carbon-graphite inclusions have an average grain size between approximately 75 and 125 μm.

In one embodiment, the interconnected pores of the matrix are impregnated with resin, carbon, metal, such as nickel, silver or antimony, TEFLON polytetrafluoroethylene, petroleum pitch, coal tar pitch, or other compounds or materials. The exact composition and density of the final composite material depends upon the material used to impregnate the pores. In the preferred embodiment, in which the pores are impregnated with phenolic resin which is carbonized to form carbon, the final composite material typically comprises a densified self-sintered matrix of approximately 65 to 80% by weight silicon carbide, approximately 10 to 18% by weight carbon-coated graphite inclusions dispersed throughout the matrix and small amounts, approximately 0.3 to 3.0% by weight of boron and free carbon as residual sintering aids. The matrix has a microstructure of interconnected pores impregnated with approximately 10 to 17% by weight carbon. Typically, the final composite material of the preferred embodiment has a density between approximately 2.55 and 2.65 gm/cc.

Figure 1:
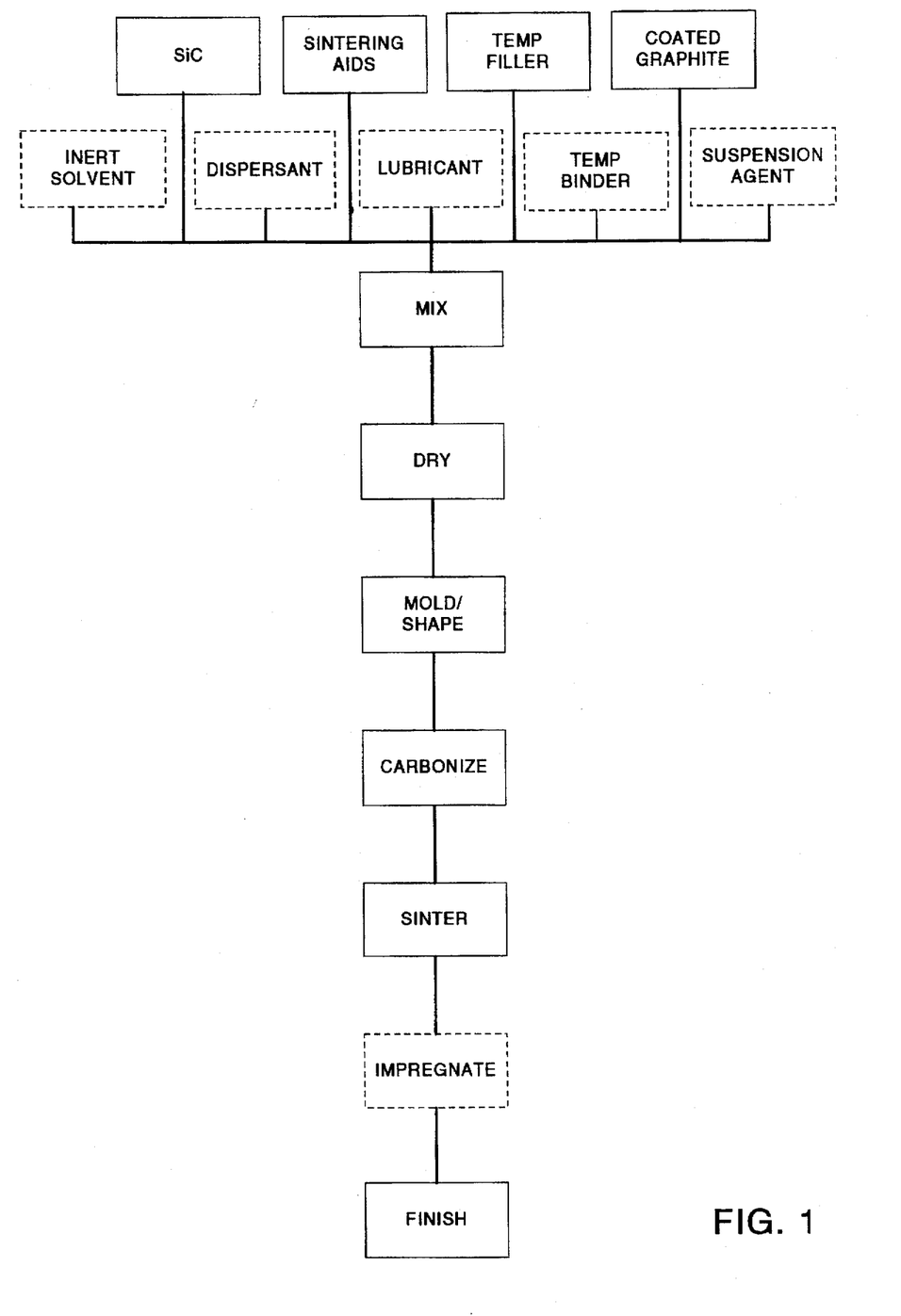
FIG. 1 is a schematic illustration of the process for producing a self-sintered silicon carbide/carbon-graphite composite material having impregnated interconnecting pores according to the present invention.

The process for producing a self-sintered composite material of the present invention is shown schematically in FIG. 1. The composite body is produced from a raw batch of silicon carbide, sintering aids, temporary filler to provide the interconnected pores, and coated graphite for providing the inclusions of carbon-coated coated graphite particles in the sintered matrix. Process aids, such as temporary binders and/or lubricants, can also be included in the raw batch to facilitate the molding or shaping of the raw batch into a green body or to facilitate other processing steps.

The raw batch is produced from fine-grained, high purity silicon carbide powder. Preferably, at least 0.5% α-silicon carbide relative to B-silicon carbide is used. However, any combination of the forms of silicon carbide may be used. Typically, approximately 50 to 90% by weight (of the total raw batch) of silicon carbide is dispersed in an inert solvent, such as water, to form a slurry which aids complete mixing of the raw batch ingredients during preparation. Other mixing aids, such as a dispersant, for example, ammonium polymethacrylate, or a suspension agent, such as xanthan gum, may also be added.

Sintering aids, such as aluminum, beryllium oxide, a boron source and/or a carbon source, are added to the slurry and mixed thoroughly to ensure complete dispersion. Such boron sources include elemental boron and boron carbide ($B_4C$), and such carbon sources include elemental carbon or a carbonizable organic material, such as phenolic resin, petroleum pitch, coal tar pitch, furfuryl alcohol or sugar. Typically, approximately 2.0 to 20% by weight (of the total raw batch) of the sintering aids are added to the slurry.

A temporary filler is also added to the slurry and thoroughly mixed for good dispersion. Typically, approximately 0.75 to 15.0% (of the total raw batch) of the temporary filler is added to the slurry. The temporary filler can be any particulate material which will decompose and volatilize out of the mixture at or below the carbonization temperature of the mixture to leave a matrix of interconnected pores. Typically, the temporary filler comprises particles of an organic material, such as ground nutshells, wax particles or polypropylene beads. In certain circumstances, for example when the temporary filler is volatilized in a vacuum at very high temperatures (at or above the melting point of the filler), an inorganic material such as ceramic beads might also be used. Preferably, the temporary filler has an average grain size between approximately 10 and 45 µm.

Another component of the raw batch is coated graphite particles, which are added to the slurry and thoroughly mixed. The coated graphite particles are coarse graphite particles coated with a carbon precursor, such as phenolic resin, or another resin or material which will decompose upon heating to leave a carbon residue. Such other materials include furfuryl alcohol, polyester, petroleum pitch, coal tar pitch, or mixtures of these and other materials. Typically, the coating is dissolved in a suitable solvent and mixed thoroughly with the graphite to bond the graphite particles. The mixture is then dried to evaporate the solvent and crushed to obtain the coated graphite particles of a desired size. Typically, the coated graphite particles are passed through a 65 mesh sieve to obtain particles of less than 212 µm. The coated graphite particles are then added to the silicon carbide slurry. Typically, approximately at least 5.0 to 50%, and preferably approximately 10 to 20%, by weight (of the total raw batch) of the coated graphite particles are added to the slurry. But any amount of such particles is helpful in improving the self-lubricating properties of the final composite material.

Process aids, including temporary binders and lubricants, for example oleic acid or any other fatty acid, can be added to the slurry. The addition of a suspension or viscosity agent is particularly helpful if the coated graphite particles are large. For example, if xanthan gum is added to the slurry and mixed, it causes the slurry to coagulate which holds the coated graphite particles in suspension, allowing uniform dispersion. Some materials added to the raw batch can perform multiple functions. For example, phenolic resin can function in the raw batch as both a carbon source sintering aid and a temporary binder. Polyethylene glycol can function as both a temporary binder and a die lubricant.

The inert solvent, temporary filler, temporary binder, dispersant, lubricant and suspension agent are all temporary additives which do not form a part of the final composite material.

The resulting slurry is mixed thoroughly to ensure sufficient dispersion and dried. Typically, the slurry is spray dried to form spherical agglomerates. Other suitable methods for obtaining such granules, such as part drying followed by crushing and sieving, may be employed.

A body made of the composite material of the present invention is produced by then molding or shaping a measured amount of the raw batch into a green body. Conventional methods of molding and shaping can be employed, such as isostatic or die pressing. Preferably, the raw batch is pressed at pressures ranging between approximately 3 and 9 tons/in$^2$ to obtain a green density of approximately 1.60 to 1.90 gm/cc.

The green body is then exposed to the appropriate environment, such as heat, to cure any temporary binders included in the raw batch. The molding and shaping of the green body can also include machining the body to a desired pre-finished shape.

The shaped green body is then carbonized in a non-oxidizing atmosphere at a temperature typically above approximately 800° F. The carbonization step carbonizes any carbonizable carbon source used as a sintering aid and decomposes and volatilizes the temporary filler, which leaves the matrix of interconnected pores. The carbonization step also carbonizes the resin of the resin-coated graphite particles and volatilizes any residue of any dispersant, lubricant or suspension agent of the raw batch.

In a typical carbonization cycle, the green body is heated in an oven from room temperature to 350° F. during a half hour and allowed to soak at that temperature for another half hour. The temperature is then raised to 850° F. over a period of 10 hours and held at 850° F. for five hours to carbonize the body. The body is then cooled to room temperature. Other carbonization cycles may be used.

The carbonized green body is then pressureless sintered typically at a temperature ranging from approximately 1900° to 2500° C. in a substantially inert atmosphere at or below atmospheric pressure to densify the matrix. Preferably, the matrix is sintered to a density between approximately 2.10 and 2.60 gm/cc or 12 to 15% shrinkage. In a typical sintering cycle, the temperature is raised to the sintering temperature over an eight hour period, the furnace is held at the peak temperature for one hour, and then allowed to cool to room temperature. The actual times depend upon the particular furnace used. Other suitable sintering cycles may also be employed. The carbonization cycle and sintering cycle may be carried out in the same furnace in sequential cycles.

In the preferred embodiment, the sintered body typically comprises a densified, self-sintered matrix of approximately 80 to 90% by weight silicon carbide, approximately 10 to 20% by weight carbon-coated graphite inclusions dispersed throughout the matrix, and small amounts, approximately 0.3 to 3.0% by weight, of boron and carbon as residual sintering aids. The matrix has a microstructure of interconnected pores, and the sintered body has approximately 3 to 12% absorption, or approximately 8 to 30% porosity.

The sintered body can then be impregnated with carbon, resin, metal, such as nickel, silver or antimony, TEFLON or other compounds or materials selected for their self-lubricating properties to achieve desired tribological characteristics for a specific application. If a resin is used as a carbon precursor to impregnate the interconnected pores with carbon, the sintered body must once again be heated to carbonize the resin. If the sintered body is to be used in sealing applications, the interconnected pores must be sufficiently impregnated to seal the body and prevent leaks.

Finally, if necessary, the impregnated sintered body can be finished by grinding, diamond polishing or any other finishing method.

EXAMPLE

The preferred embodiment of the present invention, which is described in this Example, was prepared from a raw batch of mostly beta silicon carbide, some alpha silicon carbide, boron carbide ($B_4C$), phenolic resin, polyethylene glycol, polypropylene beads, xanthan gum and phenolic resin-coated graphite particles.

In the preferred embodiment, 100 parts (69.0% by weight of the total raw batch) of β-silicon carbide having a BET specific surface area of approximately 13.5–18.5 $m^2/g$ and a particle size below approximately 2.40 µm, and one part (0.7% by weight of the total raw batch) of $B_4C$ as a water slurry were stirred for one half hour. Superior Graphite HSC-059(s), which is a premixed slurry of β-silicon silicon carbide and $B_4C$ in water, was used. Four parts (2.8% by weight of the total raw batch) of β-carbide, LONZA CARBOGRAN UF-10, having a BET surface area of approximately 9.0–11.0 $m^2/g$ and a particle size below approximately 3.0 µm, which had been dispersed in deionized water with 0.03 parts (0.02% by weight of the total raw batch) of ammonium polymethacrylate (DARVAN C) dispersant and ball milled, were then added to the slurry while the stirring continued.

While stirring, five parts (3.4% by weight of the total raw batch) of phenolic resin pre-dispersed in an equal amount of deionized water were added. The phenolic resin, which is a known binder and has a char yield of approximately 50%, is a carbon source and functioned as both a sintering aid and a temporary binder.

Seven parts (4.8% by weight of the total raw batch) of modified polyethylene glycol, PEG Compound 20M made by Union Carbide, was premixed with water as a solution of 33% polyethylene glycol and 67% water. The polyethylene glycol solution was then added to the raw batch while the stirring continued. The polyethylene glycol functioned in the raw batch as both a temporary binder and as a lubricant for the subsequent molding and shaping step.

Eleven parts (7.6% by weight of the total raw batch) of PROPYLTEX 325 S polypropylene beads made by Micro Powder, Inc. were slowly added to the slurry while the stirring continued. The polypropylene beads, which were all under 44 µm and had a mean particle size of 11–15 µm, functioned as the temporary filler used to create the interconnected pores of the matrix of the final body.

While stirring, one part (0.7% by weight of the total raw batch) of dispersible xanthan gum was added as a suspension agent. The mixture was then stirred for one hour to thoroughly mix the ingredients and to coagulate the slurry.

Sixteen parts (11.0% by weight of the total raw batch) of resin-coated graphite particles, which functioned as the coated graphite particles, were then added to the mixture while the stirring continued. The resin-coated graphite particles were prepared from a mixture of 80% by weight coarse graphite, LONZA KS-150, having a particle size below approximately 180 µm, and an average particle size of approximately 65 µm, and 20% by weight DURITE RD-2414 phenolic resin in powdered form which had been dissolved in acetone. The phenolic resin/acetone/graphite mixture was mixed thoroughly to bond the resin to the graphite. The mixture was then dried to evaporate the acetone, crushed and sieved to obtain resin-coated graphite particles having an average size of 100 µm.

After the resin-coated particles were added to the slurry, the resultant slurry was stirred for a minimum of one hour, spray dried and screened through a 35 mesh.

A measured amount of the raw batch was then isostatic pressed into a shaped green body to a green density of approximately 1.90 gm/cc (approximately 9 tons/$in^2$ pressure). The binders were then cured at 250° F. for 5 hours and the green body was pre-machined to a desired pre-finished shape.

The green body was then heated to 850° F. for 5 hours to carbonize the phenolic resin and to decompose and volatilize the polypropylene beads to form the matrix of interconnected pores. The carbonization cycle also decomposed and volatilized any residual amounts of the polyethylene glycol and xanthan gum used as temporary binder, lubricant and suspension agent.

The green body was then pressureless sintered to a density of approximately 2.40 gm/cc or 12% shrinkage at a 2190° C. peak temperature in Argon at approximately two-thirds atmosphere for approximately one hour. The resulting sintered body comprised a densified, self-sintered matrix of approximately 85% by weight silicon carbide, approximately 13% by weight carbon-coated graphite inclusions dispersed throughout the matrix and small amounts, approximately 2.0% by weight, of boron and carbon as residual sintering aids. The silicon carbide had an average grain size between approximately 10 and 25 µm, and the carbon-graphite inclusions had an average grain size between approximately 75 and 125 µm. The resulting sintered body had approximately 8% absorption, or approximately 19% porosity.

The interconnected pores of the densified matrix body were then impregnated with phenolic resin, which was cured at 350° F. at approximately 85–110 psig for 6 hours. The impregnated phenolic resin was then carbonized very slowly for 48 hours at a peak temperature of 850° F. For some batches, if necessary, the body was impregnated a second time with phenolic resin, which was cured and carbonized, to ensure that the final composite body was leak proof.

The body was then finished by grinding and diamond polishing.

Figure 2A:
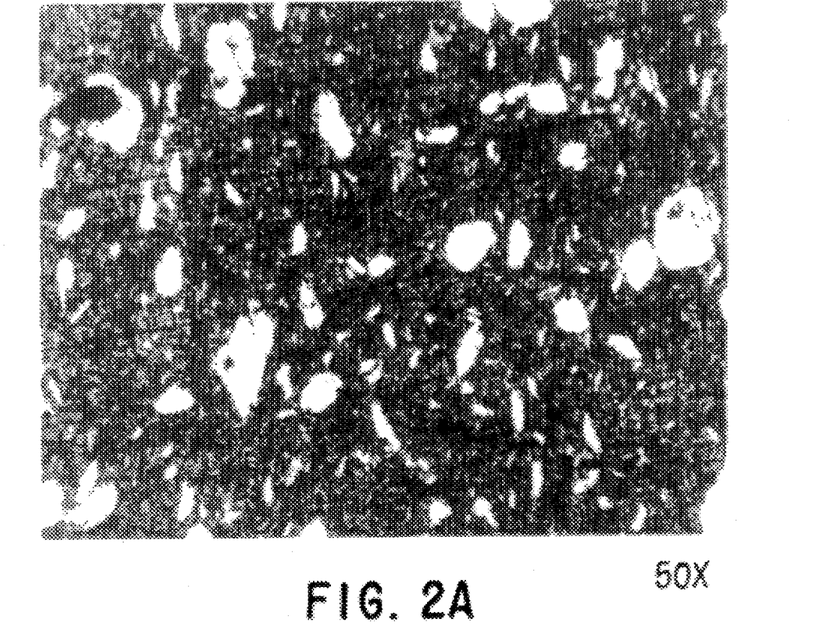
FIGS. 2A and B are photomicrographs, taken at 50× and 200× respectively, of a self-sintered silicon carbide/carbon-graphite composite material having impregnated interconnecting pores according to the present invention.
Figure 2B:
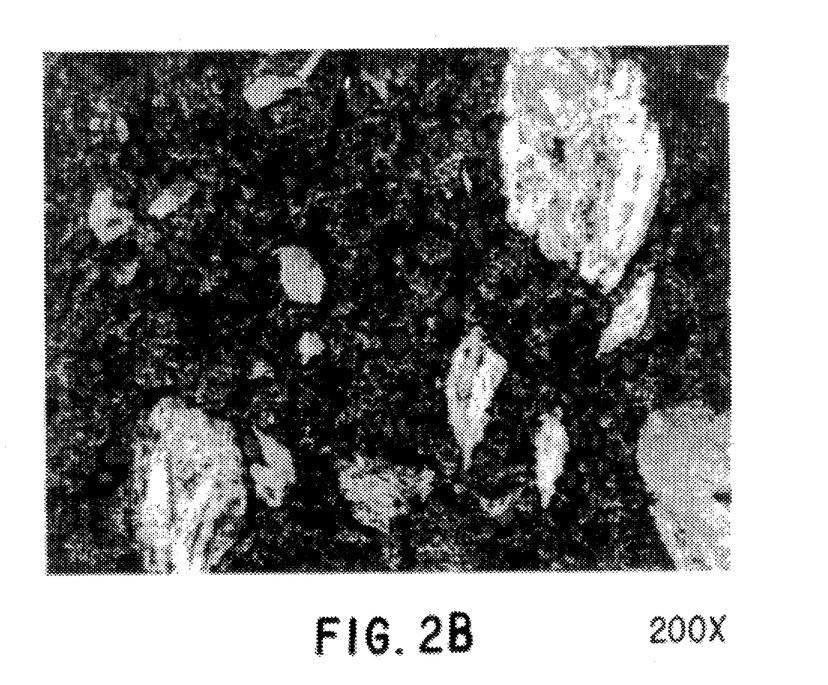

The composite material, shown in FIGS. 2A and 2B, throughout the body comprised a densified self-sintered matrix of approximately 73% by weight silicon carbide approximately 11% by weight carbon-coated graphite inclusions dispersed throughout the matrix and small amounts, approximately 2% by weight, of boron and free carbon as residual sintering aids. The silicon carbide had an average grain size between approximately 10 and 25 µm, and the carbon-graphite inclusions had an average grain size between approximately 75 and 125 µm.

The densified matrix had a microstructure of interconnected pores impregnated with approximately 14% by weight carbon. The interconnected pores, which contained carbon carbonized from the impregnated phenolic resin, had an average size of approximately 13 µm. The final body had a density of between approximately 2.55 and 2.65 gm/cc or 88 to 92% of the theoretical density as determined by the rule of mixtures.

EXAMPLE

The body of this example of the present invention was prepared in a manner identical to the process described for the previous example, except that in place of the combination of beta and alpha silicon carbide used in the previous example, alpha silicon carbide was used for this example. First, 10 lbs. of α-silicon carbide, LONZA CARBOGRAN UF-10, having a BET surface area of approximately 9.0–11.0 $m^2/g$ and a particle size below approximately 3.0

μm, was mixed with 15 lbs of deionized water and 10 gms. of DARVAN C dispersant to form a slurry. The slurry was ball milled for two hours.

One-hundred four parts (71.8% by weight of the total raw batch) of α-silicon carbide in the water slurry was then mixed with one part (0.7% by weight of the total raw batch) of $B_4C$ and stirred for one half hour. The processing then continued as described above for the previous example.

The sintered body before impregnation comprised a densified, self-sintered matrix of approximately 85% by weight silicon carbide, approximately 13% by weight carbon-coated graphite inclusions dispersed throughout the matrix and small amounts, approximately 2.0% by weight, of boron and carbon as residual sintering aids. The silicon carbide had an average grain size between approximately 10 and 25 μm, and the carbon-graphite inclusions had an average grain size between approximately 75 and 125 μm.

Figure 3A:
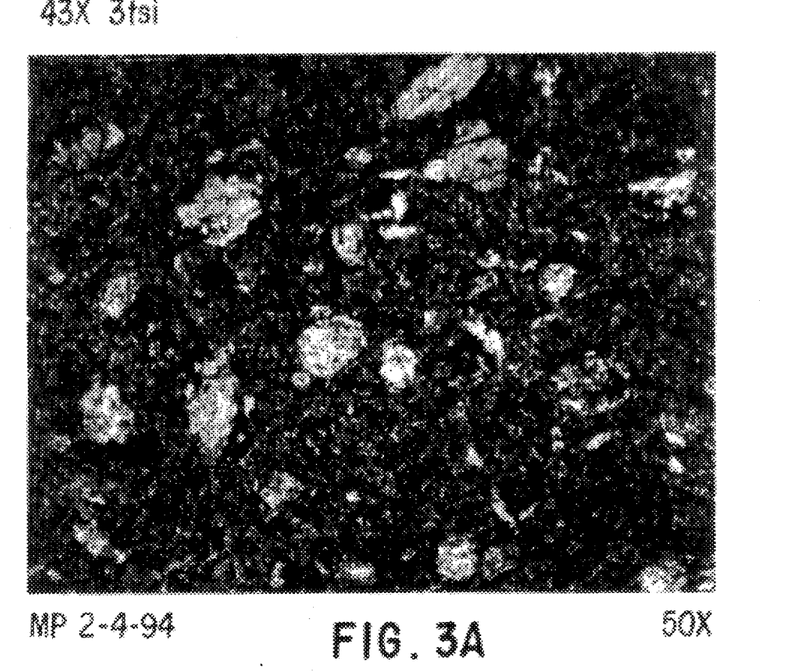
FIGS. 3A, 3B and 3C are photomicrographs, taken at 50×, 200× and 400× respectively, of a further self-sintered silicon carbide/carbon-graphite composite material having impregnated interconnecting pores according to the present invention.
Figure 3B:
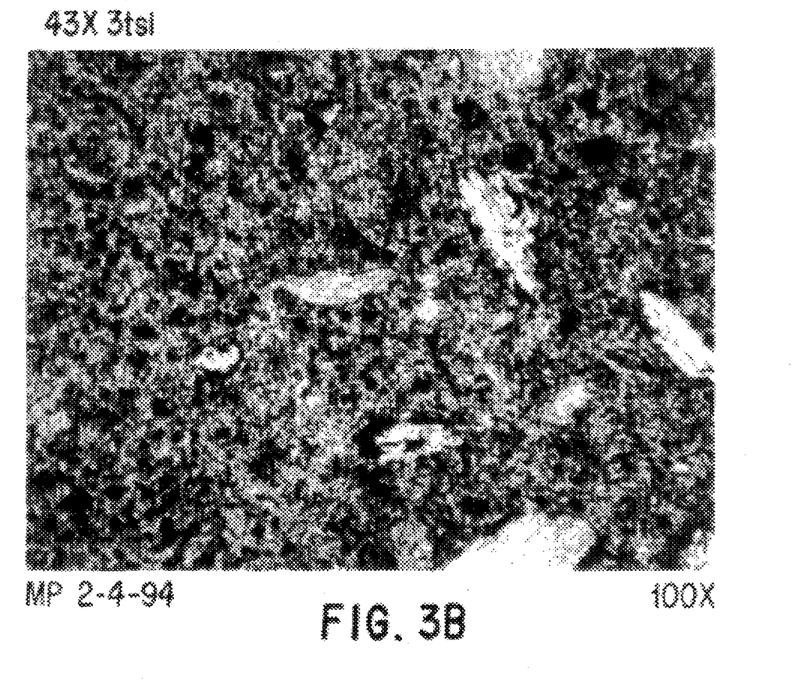
Figure 3C:
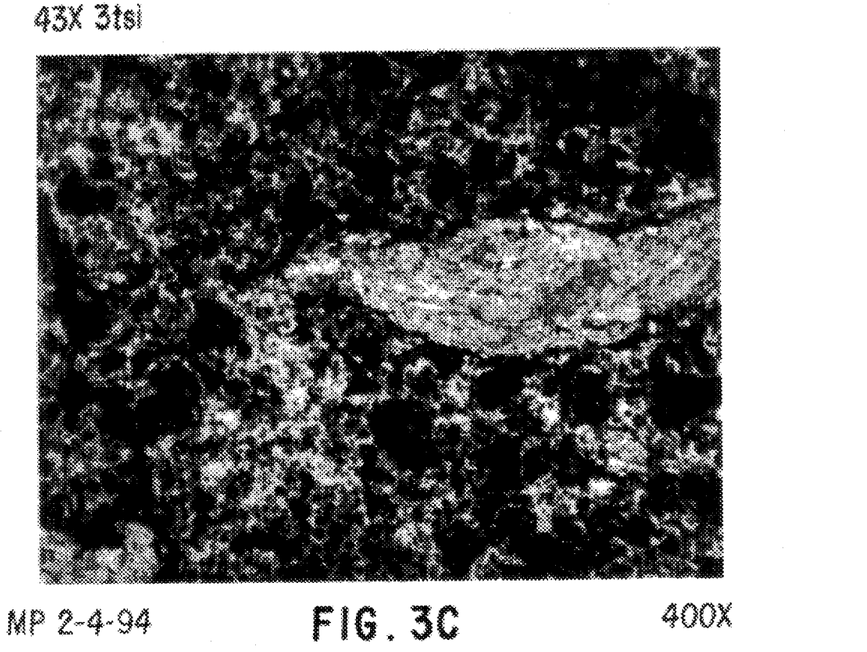

After impregnation, the composite material, shown in FIGS. 3A, 3B and 3C, throughout the body of this Example comprised a densified self-sintered matrix of approximately 73% by weight silicon carbide, approximately 11% by weight carbon-coated graphite inclusions dispersed throughout the matrix and small amounts, approximately 2% by weight, of boron and free carbon as residual sintering aids. The silicon carbide of the final composite material had an average grain size between approximately 10 and 25 μm, and the carbon-graphite inclusions had an average grain size between approximately 75 and 125 μm.

The densified matrix of this Example also had a microstructure of interconnected pores filled with approximately 14% by weight carbon carbonized from the impregnated phenolic resin. The interconnected pores had an average size of approximately 13 μm. The final body had a density of approximately 2.60 gm/cc or 90% of the theoretical density as determined by the rule of mixtures.

Figure 4A:
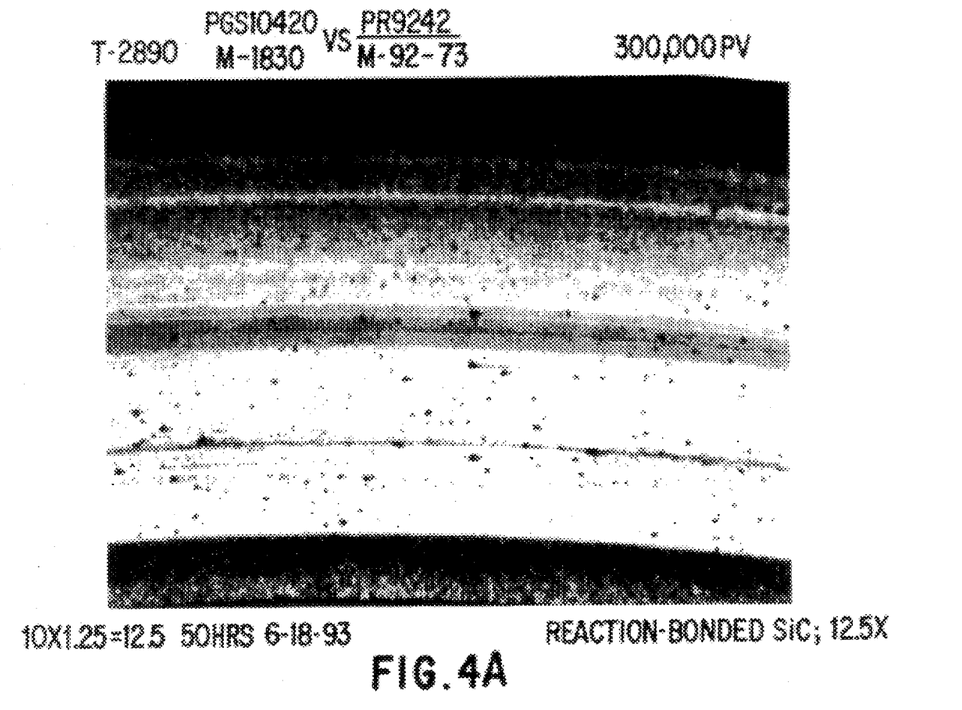
FIGS. 4A and 4B are photomicrographs, taken at 12.5×, of opposing seal faces taken after wear testing involving a material of the present invention and reaction-bonded silicon carbide.
Figure 4B:
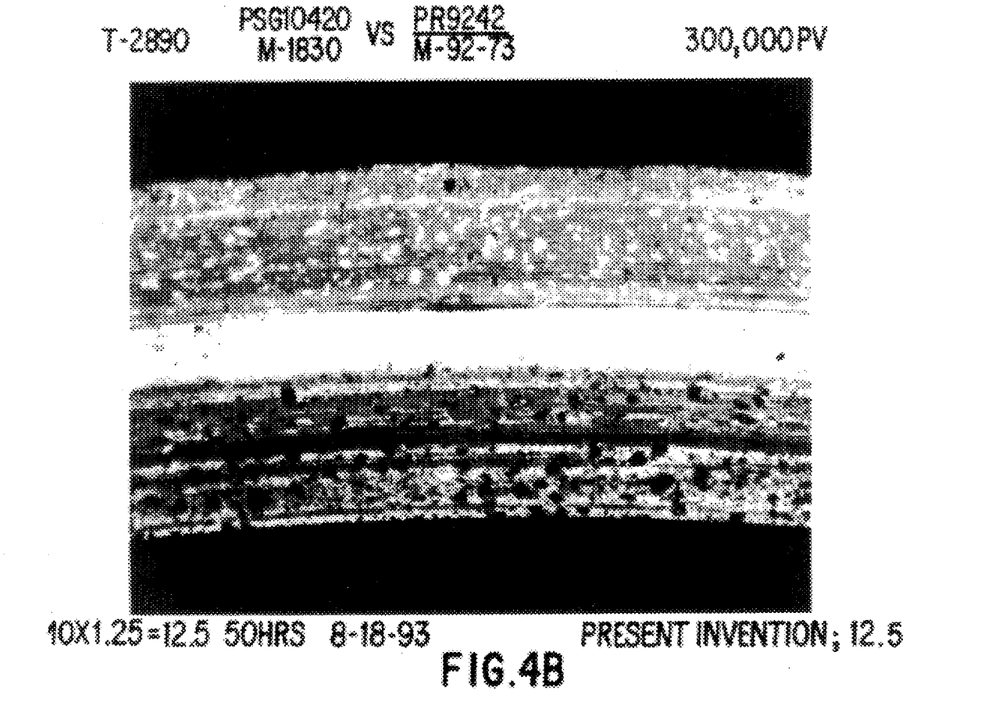

Results from wear and other testing of the composite material of the present invention demonstrate that the materials have wear characteristics and thermal shock resistance superior to other silicon carbide materials, and are self-lubricating. In one test, seals made of the composite material of the present invention, as described in the first Example above, were run against mating rings made of reaction-bonded silicon carbide at 300,000 psi-fpm (167 psi×1802 fpm) PV in 107 psi of deionized water for 50 hours. Although the faces of the reaction-bonded silicon carbide mating rings exhibited an average wear of 0.00002 in., the faces of the seals of the material of the present invention showed no measurable wear. A representative portion of one of the faces of the reaction-bonded silicon carbide rings after testing is shown in FIG. 4A, and a representative portion of one of the faces of the seals of the present invention material after testing is shown in FIG. 4B.

Figure 5A:
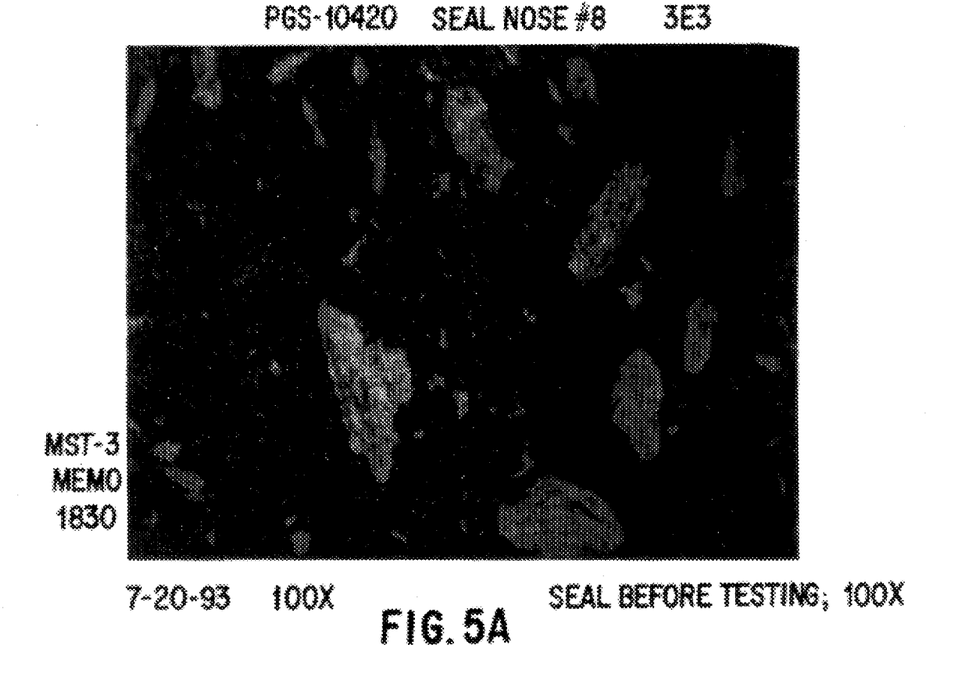
FIGS. 5A, 5B, 5C, 5D and 5E are photomicrographs of seal faces made of a material of the present invention taken before and after stages in dry run testing.
Figure 5B:
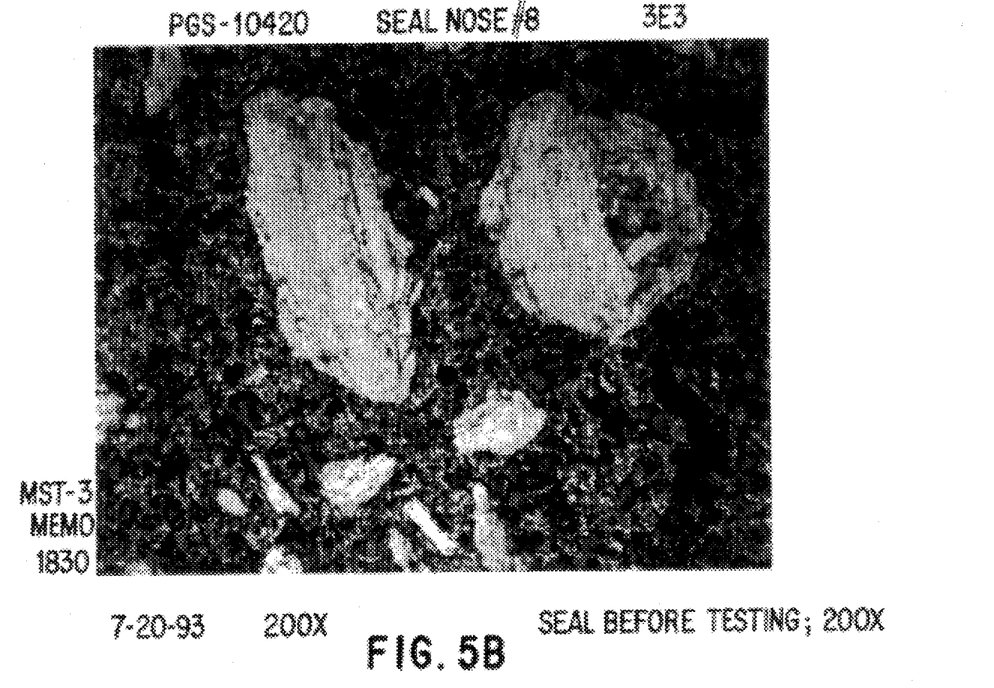
Figure 5C:
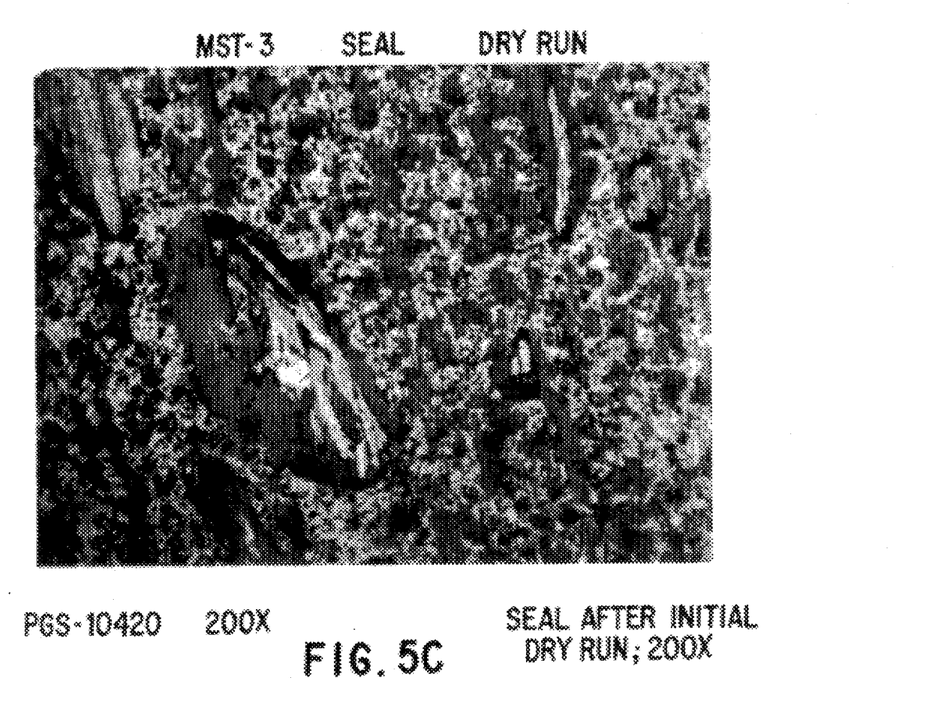
Figure 5D:
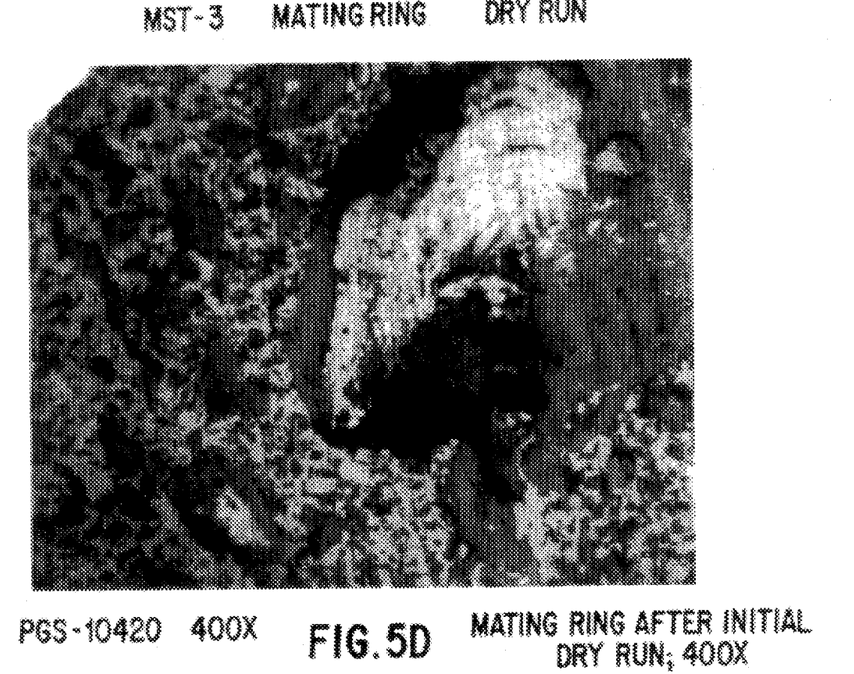

In another test, the self lubricating and dry running properties of the material of the present invention against itself were investigated. A seal and a mating ring were fabricated from the composite material of the present invention as described in the first Example, except that the phenolic resin impregnated into the pores of the matrix was not carbonized. Portions of the material of the seal, which are representative of both the seal and ring materials, are shown in FIGS. 5A and 5B. The seal and mating ring were then run against each other at 104,000 psi-fpm (57 psi×1820 fpm) PV in deionized water for one hour. The water was then removed from the system, and the seal and mating ring were run dry against each other at 56,000 psi-fpm (31 psi×1820 fpm) PV. The seal and ring ran dry for approximately 45 minutes before the impregnated resin softened and smeared, requiring shut-down. The faces of the seal and ring after shutdown are shown in FIGS. 5C and 5D respectively. The densified silicon carbide matrix, carbon-coated graphite inclusions and resin-impregnated interconnected pores can clearly be seen in FIGS. 5A–5D.

Figure 5E:
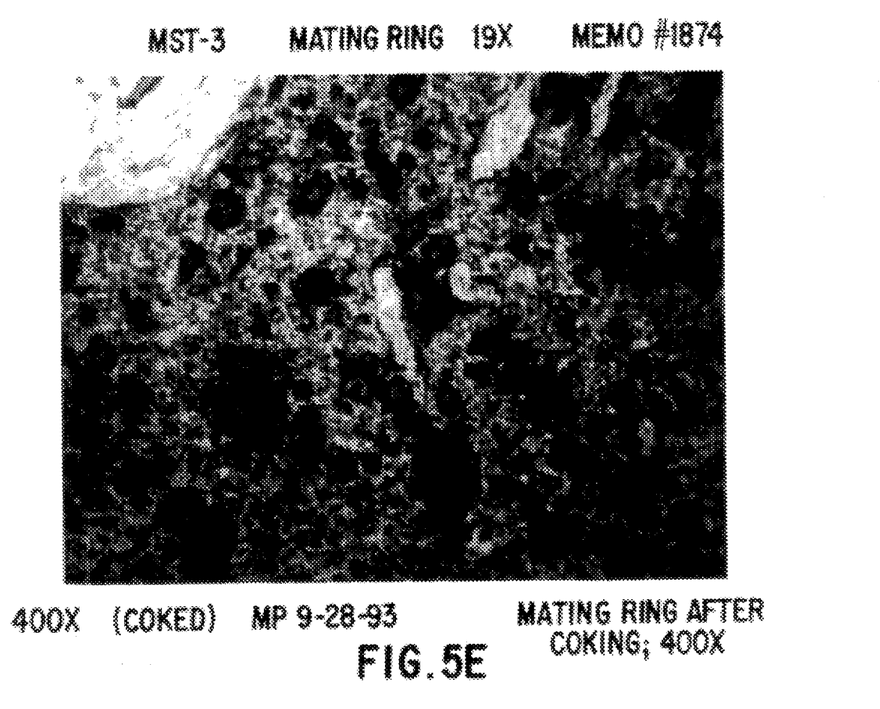

Using a 48 hour coking cycle, the seal and mating ring were then successfully coked to carbonize the impregnated resin without destroying the parts. The material of the mating ring after coking is shown in FIG. 5E, which is also representative of material of the seal after coking. The interconnected pores containing the carbon carbonized from the impregnated resin can easily be seen in FIG. 5E.

The parts were then run again against themselves for one hour in deionized water at 104,000 psi-fpm PV, and the water was once again removed. The parts successfully ran on themselves dry at 56,000 PV for one hour, at which time the test was shut down to evaluate the faces. Although there was some wear on the faces after running for one hour dry, the material of the present invention clearly demonstrated that it could survive dry running conditions.

Figure 6A:
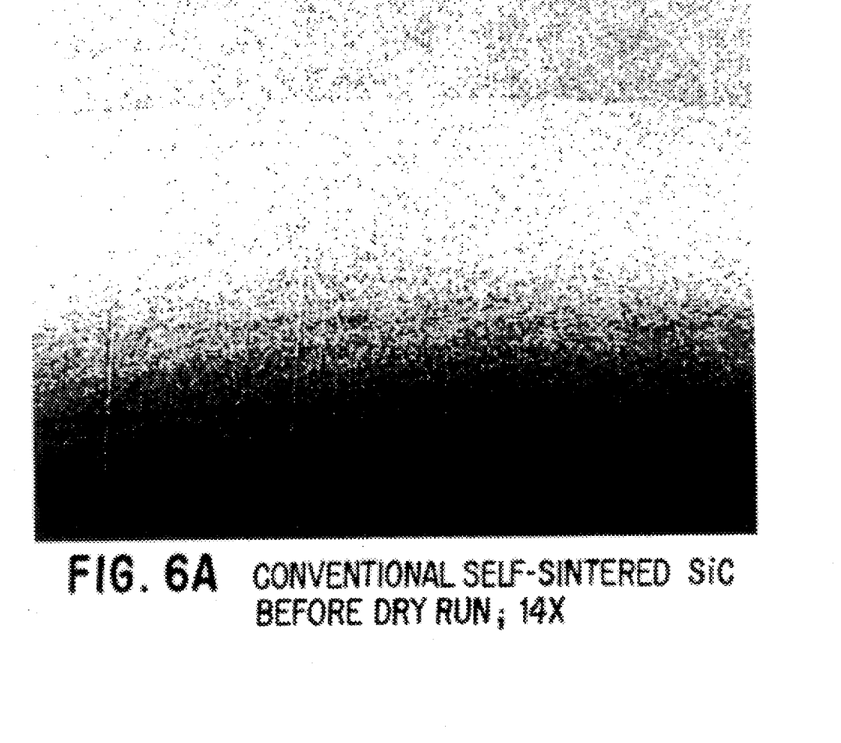
FIGS. 6A, 6B, 6C and 6D are photomicrographs, taken at 14×, of the opposing seal faces before and after catastrophic fluid loss, in dry run testing involving a material of the present invention and conventional self-sintered silicon carbide.
Figure 6B:
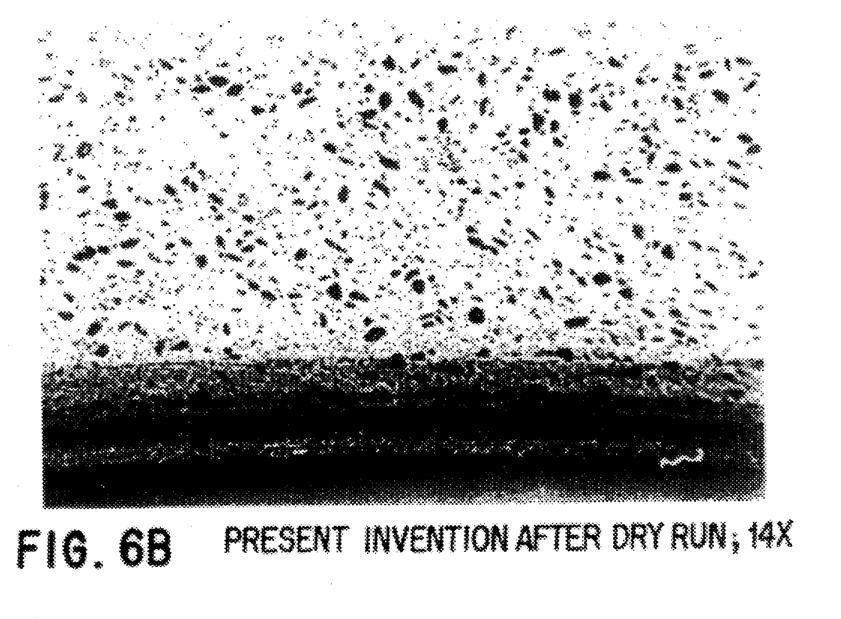
Figure 6C:
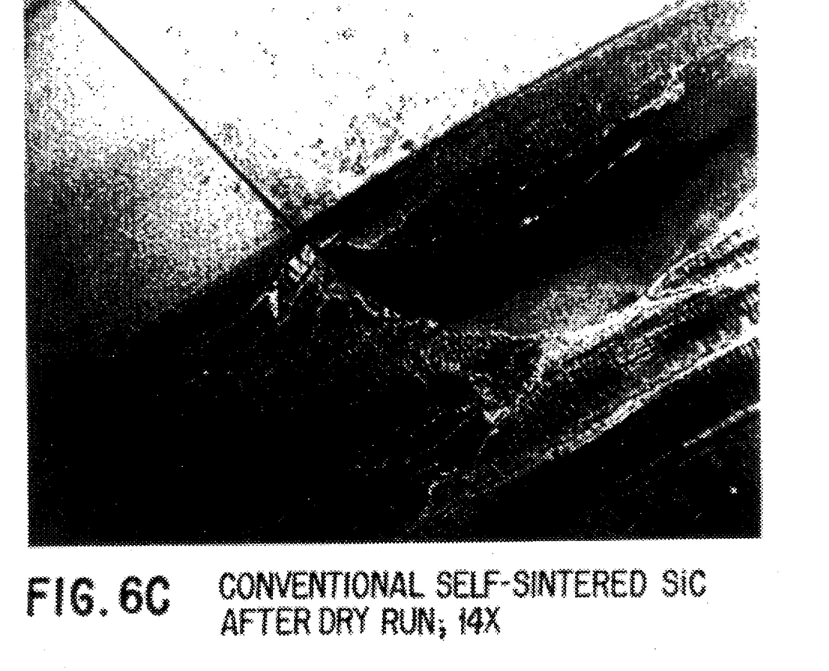
Figure 6D:
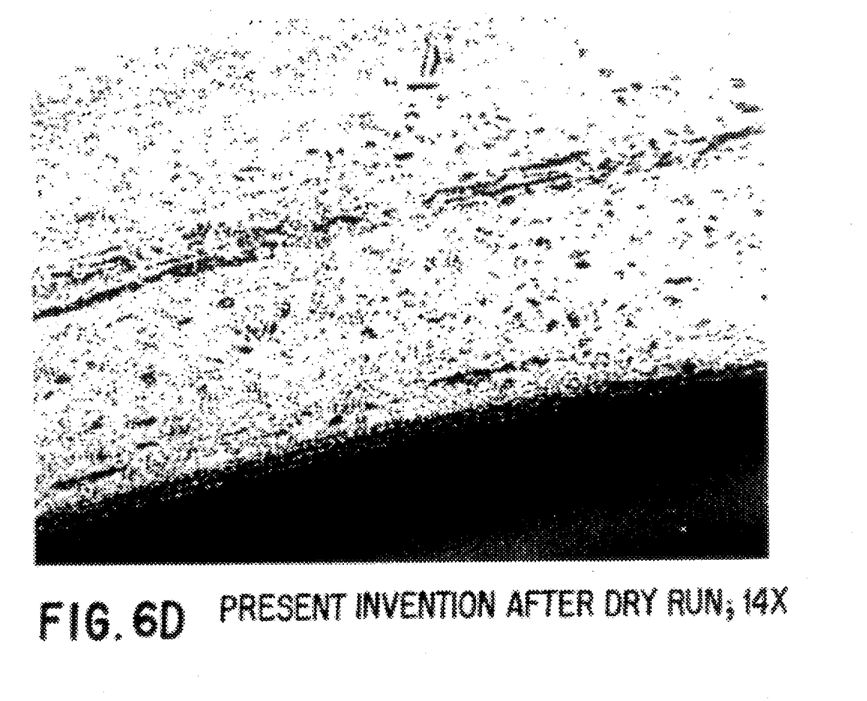

To further evaluate the self-lubricating properties of the material of the present invention, seals made of the material of the present invention, as described in the first Example above, were run against mating rings made of conventional self-sintered silicon carbide at 400,000 psi fpm (221 psi× 1820 fpm) PV in 168 psi of deionized water. After 30 minutes, the water was removed from the system and the faces were run dry. After only seconds, the test rig had to be quickly shut down because, as shown in FIG. 6C, the conventional self-sintered silicon carbide ring disintegrated. FIGS. 6A and 6B show the faces of the conventional self-sintered silicon carbide mating ring and the seal of the present invention respectively before dry running. FIGS. 6C and 6D show the faces of the conventional self-sintered silicon carbide ring and the seal of the present invention respectively after shut down. FIGS. 6C and 6D clearly show that while the conventional self-sintered silicon carbide ring disintegrated, the seal of the present invention survived the dry running test with little or no damage.

The above description is not intended to limit the present invention. Alternative embodiments are possible. Accordingly, the scope of the invention should be determined by the appended claims and their legal equivalents, not by the embodiments described and shown above.

I claim:

1. A process for producing a self-sintered silicon carbide composite material, comprising the steps of:
   (a) mixing in an inert solvent a raw batch, comprising:
      (i) about 50 to about 90% by weight silicon carbide;
      (ii) about 5.0 to about 50% graphite particles coated with a carbon precursor;
      (iii) about 2 to about 20% sintering aids; and
      (iv) about 0.75 to about 15.0% by weight temporary filler;
   (b) drying the raw batch to evaporate the inert solvent;
   (c) shaping the raw batch into a shaped body;
   (d) heating the shaped body at a temperature sufficient to carbonize the carbon precursor and volatilize the temporary filler to form a matrix having interconnected pores; and
   (e) sintering the shaped body to densify the matrix.

2. The process of claim 1, wherein the silicon carbide comprises alpha silicon carbide or beta silicon carbide, or a mixture thereof.

3. The process of claim 1, wherein the carbon precursor comprises phenolic resin, furfuryl alcohol, polyester, petroleum pitch or coal tar pitch, or fixtures thereof.

4. The process of claim 1, wherein the sintering aids comprise aluminum, beryllium oxide, a boron source or a carbon source, or mixtures thereof.

5. The process of claim 4, wherein the boron source comprises elemental boron or boron carbide, or a mixture thereof.

6. The process of claim 4, wherein the carbon source comprises elemental carbon or a carbonizable organic material, or a mixture thereof.

7. The process of claim 6, wherein the carbonizable organic material comprises phenolic resin, petroleum pitch, coal tar pitch, furfuryl alcohol or a sugar, or mixtures thereof.

8. The process of claim 1, wherein the temporary filler comprises an organic material.

9. The process of claim 8, wherein the organic material comprises, ground nutshells, wax particles or polypropylene beads, or mixtures thereof.

10. The process of claim 1, wherein the temporary filler comprises an inorganic material.

11. The process of claim 10, wherein the inorganic material comprises ceramic beads.

12. The process of claim 1, wherein the raw batch further includes about 0.3 to about 1.0% by weight of a suspension agent.

13. The process of claim 12, wherein the suspension agent includes xanthan gum.

14. The process of claim 1, wherein the raw batch further includes 2.0 to about 8.0% by weight of a temporary binder.

15. The process of claim 14, wherein the temporary binder comprises phenolic resin, polyethylene glycol or oleic acid, or a mixture thereof.

16. The process of claim 1, wherein the shaping step includes pressing the raw batch at pressures of about 3 to about 9 tons/in$^2$ to obtain a green density of about 1.60 to about 1.90 gm/cc.

17. The process of claim 1, wherein the heating step includes heating the shaped body at a temperature above 800° F.

18. The process of claim 1, wherein the sintering step includes heating the shaped body at a temperature of about 1900° to about 2500° C. in a substantially inert atmosphere at or below atmospheric pressure.

19. The process of claim 1, including the further step of impregnating the pores of the matrix with an additional material.

20. The process of claim 19, wherein the additional material comprises carbon, resin, metal or polytetrafluoroethylene, or mixtures thereof.

21. The process of claim 19, wherein the impregnation step comprises the steps of:
    (a) impregnating the pores of the matrix with a carbonaceous resin; and
    (b) carbonizing the carbonaceous resin.

22. The process of claim 21, wherein the carbonaceous resin comprises phenolic resin, petroleum pitch or coal tar pitch, or mixtures thereof.

23. The process of claim 20, wherein the metal comprises nickel, silver or antimony, or mixtures thereof.

24. The process of claim 1, wherein the raw batch comprises:
    (i) about 60 to about 80% by weight silicon carbide;
    (ii) about 10 to about 20% by weight graphite particles coated with a carbon precursor;
    (iii) about 5.0 to about 15.0% by weight temporary filler;
    (iv) about 2.0 to about 8.0% by weight temporary binder;
    (v) about 1.0 to about 5.0% by weight carbonizable organic material; and
    (vi) about 0.3 to about 1.5% by weight of a boron source.

25. The process of claim 24, wherein the silicon carbide is alpha silicon carbide or beta silicon carbide, or a mixture thereof.

26. The process of claim 24, wherein the carbon precursor comprises phenolic resin, furfuryl alcohol, polyester, petroleum pitch or coal tar pitch, or mixtures thereof.

27. The process of claim 24, wherein the temporary filler comprises, ground nutshells, wax particles or polypropylene beads, or mixtures thereof.

28. The process of claim 24, wherein the temporary binder comprises phenolic resin, polyethylene glycol or oleic acid, or a mixture thereof.

29. The process of claim 24, wherein the carbonizable organic material is phenolic resin, petroleum pitch, coal tar pitch, furfuryl alcohol or a sugar, or mixtures thereof.

30. The process of claim 24, wherein the boron source comprises elemental boron or boron carbide, or a mixture thereof.

31. The process of claim 24, wherein the raw batch further includes about 0.3 to about 1.0% by weight of a suspension agent.

32. The process of claim 31, wherein the suspension agent includes xanthan gum.

33. The process of claim 24, wherein the shaping step includes pressing the raw batch a green density of about 1.60 to about 1.90 gm/cc.

34. The process of claim 24, wherein the heating step includes heating the shaped body at a temperature above 800° F.

35. The process of claim 24, wherein the sintering step includes heating the shaped body at a temperature ranging from about 1900° to 2500° C. in a substantially inert atmosphere at or below atmospheric pressure.

36. The process of claim 24, including the further step of impregnating the pores of the matrix with an additional material.

37. The process of claim 36, wherein the additional material comprises carbon, resin, metal or polytetrafluoroethylene, or mixtures thereof.

38. The process of claim 36, wherein the impregnation step comprises the steps of:
    (a) impregnating the pores of the matrix with a carbonaceous resin; and
    (b) carbonizing the carbonaceous resin.

39. The process of claim 38, wherein the carbonaceous resin comprises phenolic resin, petroleum pitch or coal tar pitch, or mixtures thereof.

40. The process of claim 37, wherein the metal comprises nickel, silver or antimony, or mixtures thereof.

41. The process of claim 1, comprising the steps:
    (a) mixing in an inert solvent a raw batch, comprising:
        (i) about 60 to about 80% by weight silicon carbide;
        (ii) about 10 to about 20% by weight graphite particles coated with phenolic resin;
        (iii) about 5.0 to about 15.0% by weight polypropylene beads;
        (iv) about 2.0 to about 8.0% by weight polyethylene glycol;

(v) about 1.0 to about 5.0% by weight additional phenolic resin; and
(vi) about 0.3 to about 1.5% by weight boron carbide;
(vii) about 0.3 to about 1.0%, by weight xanthan gum; and (b) drying the raw batch to evaporate the inert solvent;

(c) pressing the raw batch to a green density of about 1.60 to about 1.90 gm/cc;

(d) heating the shaped body at a temperature above 800° F. to carbonize the carbon precursor and volatilize the temporary filler to form a matrix having interconnected pores; and (e) sintering the shaped body at a temperature of about 1900° to about 2500° C. in a substantially inert atmosphere at or below atmospheric pressure to densify the matrix to a density of about 2.10 to about 2.60 gm/cc.

42. The process of claim 41, wherein the silicon carbide comprises alpha silicon carbide or beta silicon carbide, or a mixture thereof.

43. The process of claim 41, including the further step of impregnating the pores of the matrix with phenolic resin and carbonizing the impregnated resin.

* * * * *

UNITED STATES PATENT AND TRADEMARK OFFICE
CERTIFICATE OF CORRECTION

PATENT NO. : 5,707,567

DATED : January 13, 1998

INVENTOR(S) : Mark E. Pfaff

It is certified that error appears in the above-indentified patent and that said Letters Patent is hereby corrected as shown below:

Column 3, line 42, delete "B" and insert --2B--

Column 6, line 1, delete "part" and insert --pan--

Column 7, line 15, delete "silicon" 2nd occurrence

Column 7, line 17, delete "β-carbide" and insert --α-silicon carbide--.

Signed and Sealed this

Fourth Day of January, 2000

Attest:

*Attesting Officer*     *Acting Commissioner of Patents and Trademarks*